(12) United States Patent
Deng et al.

(10) Patent No.: US 11,117,229 B2
(45) Date of Patent: Sep. 14, 2021

(54) AUTOMATIC ASSEMBLY MACHINE FOR COMBINED CONTROL BUTTON

(71) Applicant: DONGGUAN UNIVERSITY OF TECHNOLOGY, Dongguan (CN)

(72) Inventors: Jun Deng, Dongguan (CN); Chuliang He, Dongguan (CN)

(73) Assignee: DONGGUAN UNIVERSITY OF TECHNOLOGY, Dongguan (CN)

( * ) Notice: Subject to any disclaimer, the term of this patent is extended or adjusted under 35 U.S.C. 154(b) by 165 days.

(21) Appl. No.: 16/443,484

(22) Filed: Jun. 17, 2019

(65) Prior Publication Data
US 2019/0389015 A1 Dec. 26, 2019

(30) Foreign Application Priority Data
Jun. 25, 2018 (CN) .......................... 201810659176.6

(51) Int. Cl.
| | |
|---|---|
| *B23P 19/04* | (2006.01) |
| *B23P 19/00* | (2006.01) |
| *B23P 21/00* | (2006.01) |
| *H01H 13/88* | (2006.01) |

(52) U.S. Cl.
CPC ............. *B23P 19/04* (2013.01); *B23P 19/001* (2013.01); *B23P 21/006* (2013.01); *H01H 13/88* (2013.01)

(58) Field of Classification Search
CPC ..... B23P 19/001; B23P 19/004; B23P 19/007; B23P 19/04; B23P 21/006; Y10T 29/53265; Y10T 29/5337; Y10T 29/53374; Y10T 29/53383; Y10T 29/53435; Y10T 29/53478; Y10T 29/53548; H01H 11/00; H01H 13/88
See application file for complete search history.

(56) References Cited

U.S. PATENT DOCUMENTS

| | | | | |
|---|---|---|---|---|
| 4,144,637 | A | * | 3/1979 | Ioffe ....................... B23P 19/04 29/739 |
| 2009/0145722 | A1 | * | 6/2009 | Lompech ................ B23P 19/04 198/339.1 |

FOREIGN PATENT DOCUMENTS

| | | | | | |
|---|---|---|---|---|---|
| CN | 108470654 | A | * | 8/2018 | |
| CN | 109128810 | A | * | 1/2019 | |
| CN | 109378234 | A | * | 2/2019 | |
| CN | 109585199 | A | * | 4/2019 | |
| JP | 60090642 | A | * | 1/1988 | ............ B23P 19/004 |

* cited by examiner

*Primary Examiner* — Matthew P Travers
(74) *Attorney, Agent, or Firm* — Law Offices Of Steven W. Weinrieb

(57) ABSTRACT

An automatic assembly machine fora combined control button, includes a frame, a power distribution control box, a turntable and turntable drive disposed on the frame so as to fit with each other, wherein the base fixtures fitting controller bases are evenly disposed along the circumference of the turntable; the front side of the frame located at the right side of the turntable is disposed with a base feeding mechanism; the rear side of the base feeding mechanism located on the frame is provided with a base transportation device fitting with the base fixtures; and the left side of the base transportation device along the rotating direction of the turntable is provided with a button assembly mechanism cooperating with the base fixtures.

8 Claims, 7 Drawing Sheets

AUTOMATIC ASSEMBLY MACHINE FOR COMBINED CONTROL BUTTON

FIELD OF THE INVENTION

The present invention relates to an automatic assembly machine, more particularly to an automatic assembly machine for a combined control button.

BACKGROUND OF THE INVENTION

Existing combined control buttons generally consist of three parts: a controller base 48, several button sleeve rods 49, and several buttons 39, in which the button sleeve rods 49 are mounted on the controller base 48 side by side and the bottoms thereof are electrically connected to the signal end. The buttons 39 are fitted to the button sleeve rods 49 by plugging and fitting, therefore, the combined control button is assembled according to the determined relationship among above three parts. At present, the combined control buttons are generally assembled manually or by semi-automatic machines, process thereof is relatively complicated and as most of the assembly process is done manually, defects such as low production efficiency, large consumption of human resources, high labor intensity, relatively high probability of safety hazards, and high product defect rate etc are common to see.

OVERALL OBJECTIVE OF THE INVENTION

The overall objective of the present invention is to provide an automatic assembly machine for combined control button, which automatically feeds through a base feeding mechanism, accurately transports the controller base to the base fixture by the base transportation device, and continuously presses the button automatically through the button assembly mechanism. The present invention is able to effectively solve the problems of the existing combined controller adopting the manual inserting button during assembly, which has problems as low productivity, large human resource consumption, high labor intensity of the operator, high probability of relative safety hazards, and high defect rate of the electrical connector.

In order to achieve the aforenoted objective, the technical solutions adopted by the present invention are:

An automatic assembly machine for a combined control button, including a frame 1, a power distribution control box, turntable 3 and turntable drive device disposed on the frame 1 fitting with each other, wherein the base fixtures 38 fitting the controller bases 48 are evenly disposed along the circumference of the turntable 3; the base fixtures 38 are respectively provided with positioning slots 56 interference fitting with the controller bases 48, and positioning rods 55 are symmetrically disposed on the left and right sides of the positioning slot 56; the positioning rods 55 fit corresponding positioning holes 50 disposed on the controller bases 48 by plugging and fitting; the front side of the frame 1 located at the right side of the turntable 3 is disposed with a base feeding mechanism 2, the rear side of the base feeding mechanism 2 located on the frame 1 is provided with a base transportation device 6 fitting with the base fixtures 38; the left side of the base transportation device 6 along the rotating direction of the turntable 3 is provided with a button assembly mechanism 4 cooperating with the base fixtures 38; the button assembly mechanism 4 cooperates with a button vibration feeding tray 5 disposed on the frame 1; all of the turntable drive device, the base feeding mechanism 2, the button assembly mechanism 4 and the button vibration feeding tray 5 are electrically connected to the power distribution control box.

Preferably, the base feeding mechanism 2 includes a base feeding support 8 disposed on the front side of the frame 1; feeding chain wheels 13 are symmetrically disposed on the left and right sides of the base feeding support 8; the feeding chain wheel 13 is evenly provided with feeding tray supporting plates 12 fitting with the bottom of a feeding tray sets 9; the feeding chain wheel 13 is synchronously running with a driven feeding shaft 14 disposed on the base feeding support 8; the driven feeding shaft 14 is driven by a feeding motor 15 and a feeding belt pulley 16 disposed on the bottom of the base feeding support 8; the upper end of the base feeding support 8 is provided with a feeding tray clamping device 11 fitting the feeding tray sets 9, and the front side of the base feeding support 8 is provided with a feeding tray pushing device 10; the feeding tray pushing device 10 is flush with the feeding tray set 9 clamped by the feeding tray clamping device 11; all of the feeding motor 15, the feeding tray pushing device 10 and feeding tray clamping device 11 are electrically connected to the power distribution control box.

Preferably, the feeding tray set 9 includes a feeding tray base 52; the upper surface of the feeding tray base 52 is provided with a storage slot 51 fitting the controller base 48; at least four sets of feeding tray separation posts 53 are symmetrically disposed on the front and rear sides of the storage slot 51 on the feeding tray base 52; the left and right sides of the feeding tray base 52 are provided with feeding tray clamping slots 54.

Preferably, the feeding tray clamping device 11 includes a reclaiming fixed seat 22 disposed on the upper end of the base feeding support 8; the reclaiming fixed seat 22 is disposed with a vertically downward feeding tray lifting cylinder 20; the output of the feeding tray lifting cylinder 20 is connected with a feeding tray rising plate 19, and the upper surface of the feeding tray rising plate 19 is connected with feeding tray lifting sliding poles 21, and the feeding tray lifting sliding poles 21 cooperate with the reclaiming fixed seat 22 by plugging and fitting; the left and right ends of the feeding tray rising plate 19 are provided with feeding tray clamping cylinders 28; the outer ends, of the feeding tray clamping cylinder 28 is connected with L-shaped lifting plates 23, and the lower end of the lifting plates 23 are slidably fitting with the feeding tray clamping slots 54; the feeding tray lifting cylinder 20 and the feeding tray clamping cylinder 28 are all electrically connected to the power distribution control box.

Preferably, the feeding tray pushing device 10 includes a pushing fixed seat 25 disposed on the front side of the base feeding support 8, a pushing cylinder 26 is horizontally disposed on the front side of the pushing fixed seat 25, and the output of the pushing cylinder 26 is connected with a feeding tray pushing plate 24; the feeding tray pushing plate 24 is flush with the feeding tray set 9 clamped by the feeding tray clamping device 11, and a pushing sliding rod 27 cooperates with the pushing fixed seat 25 by plugging and fitting is horizontally disposed on the feeding tray pushing plate 24; the pushing cylinder 26 is electrically connected to the power distribution control box.

Preferably, the rear side of the base feeding support 8 locating at the frame 1 is disposed with a guiding supporting frame 18, the guiding supporting frame 18 is horizontally provided with a feeding tray guiding plate 17, and the rear side of the feeding tray guiding plate 17 is provided with a tilted feed slide way 7, and the upper end of the feed slide way 7 is butted to the rear end of the feeding tray guiding plate 17.

Preferably, the button assembly mechanism 4 includes a button assembly support 30 disposed on the frame 1; a vertically downward reclaiming lifting cylinder 34 is disposed on the upper end of the button assembly support 30; the output of the reclaiming lifting cylinder 34 is connected with a reclaiming lifting seat 36 slidable against the button assembly support 30; the reclaiming lifting seat 36 is horizontally provided with a horizontally movable reclaiming cylinder 35; the output of the horizontally movable reclaiming cylinder 35 is connected with a gear rack 33 slidable against the reclaiming lifting seat 36, and a gear shaft 32 engaging with the gear rack 33 is vertically disposed on the reclaiming lifting seat 36; the lower end of the gear shaft 32 passes through the reclaiming lifting seat 36 and is connected with a button reclaiming seat 31, the bottom of the button reclaiming seat 31 is symmetrically disposed with two button clamping jaws 37; the button clamping jaws 37 cooperate with buttons 39 disposed on the button distribution track 29; the reclaiming lifting cylinder 34, the horizontally movable reclaiming cylinder 35 and the button clamping jaw 37 are all electrically connected to the power distribution control box.

Preferably, the base transportation device 6 includes a transportation support 40 disposed on the frame 1; the transportation support 40 is horizontally provided with transportation sliding rods 41 and a transportation screw rod 42, the transportation screw rod 42 is connected with the output of the transportation servo motor 44 disposed on the transportation support 40; the transportation screw rod 42 is connected with a nut seat, which cooperates with the transportation sliding rods 41 by plugging and fitting, and the nut seat is provided with a transportation translation seat 45; a transportation translation cylinder 43 is horizontally disposed on the transportation translation seat 45, the output of the transportation translation cylinder 43 is connected with a upper reclaiming plate 46; the end of the upper reclaiming plate 46 is vertically provided with a disclaiming lift cylinder 47, and the output of the disclaiming lift cylinder 47 is mounted with a base clamping jaw 57 fitting with the controller base 48; all of the transportation servo motor 44, the transportation translation cylinder 43, the disclaiming lift cylinder 47 and the base clamping jaw 57 are electrically connected to the power distribution control box.

REFERENCE NUMBER KEY

The drawings include the following components:
1. Frame;
2. Base feeding mechanism;
3. Turntable;
4. Button assembly mechanism;
5. Button vibration feeding tray;
6. Base transportation device;
7. Feed slide way;
8. Base feeding support;
9. Feeding tray set;
10. Feeding tray pushing device;
11. Feeding tray clamping device;
12. Feeding tray supporting plate;
13. Feeding chain wheel;
14. Driven feeding shaft;
15. Feeding motor;
16. Feeding belt pulley;
17. Feeding tray guiding plate;
18. Guiding supporting frame;
19. Feeding tray rising plate;
20. Feeding tray lifting cylinder;
21. Feeding tray lifting sliding pole;
22. Reclaiming fixed seat;
23. Lifting plate;
24. Feeding tray pushing plate;
25. Pushing fixed seat;
26. Pushing cylinder;
27. Pushing sliding rod;
28. Feeding tray clamping cylinder;
29. Button distribution track;
30. Button assembly support;
31. Button reclaiming seat;
32. Gear shaft;
33. Gear rack;
34. Reclaiming lifting cylinder;
35. Horizontally movable reclaiming cylinder;
36. Reclaiming lifting seat;
37. Button clamping jaw;
38. Base fixture;
39. Button;
40. Transportation support;
41. Transportation sliding rod;
42. Transportation screw rod;
43. Transportation translation cylinder;
44. Transportation servo motor;
45. Transportation translation seat;
46. Upper reclaiming plate;
47. Reclaiming lifting cylinder;
48. Controller base;
49. Button sleeve rod;
50. Positioning hole;
51. Storage slot;
52. Feeding tray base;
53. Feeding tray separation post;
54. Feeding tray clamping slot;
55. Positioning rod;
56. Positioning slot;
57. Base clamping jaw.

DETAILED DESCRIPTION OF THE ILLUSTRATED EMBODIMENT

In order to make those skilled in the art understand the technical solutions of the present invention better, the present invention will be described in detail below with reference to the accompanying drawings. The description of the present section is merely exemplary and explanatory, and should not be construed as limiting the scope of the invention.

Figure 1:
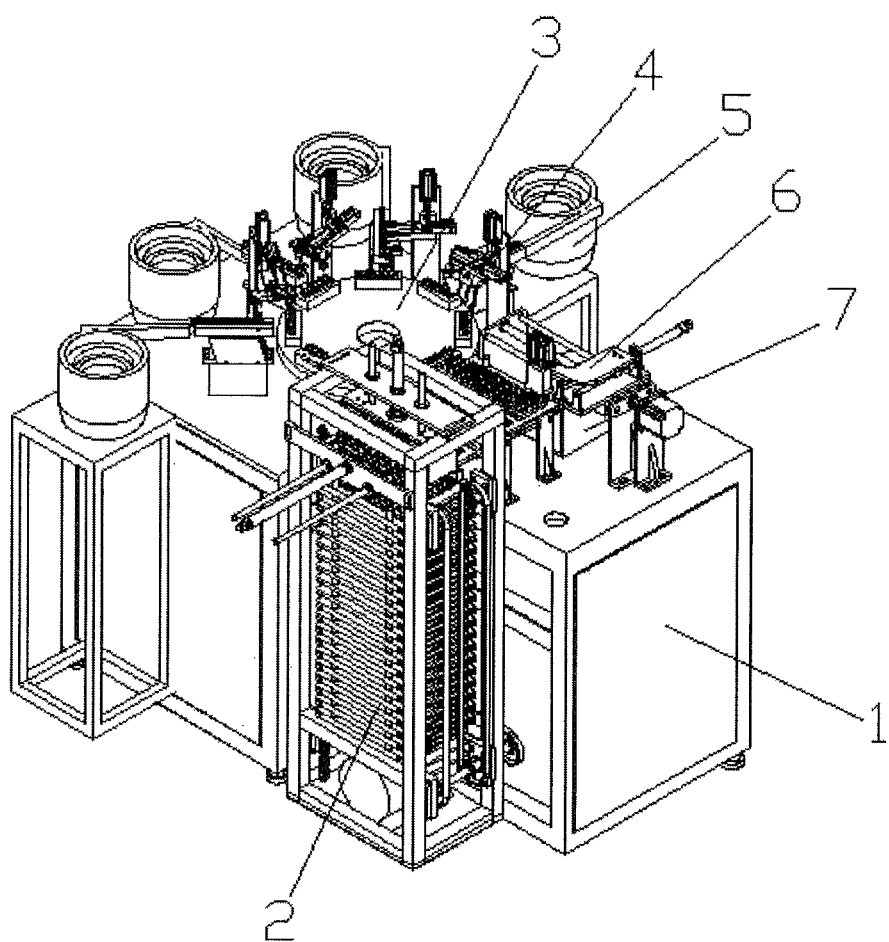
FIG. 1 is a schematic perspective view of the present invention.
Figure 2:
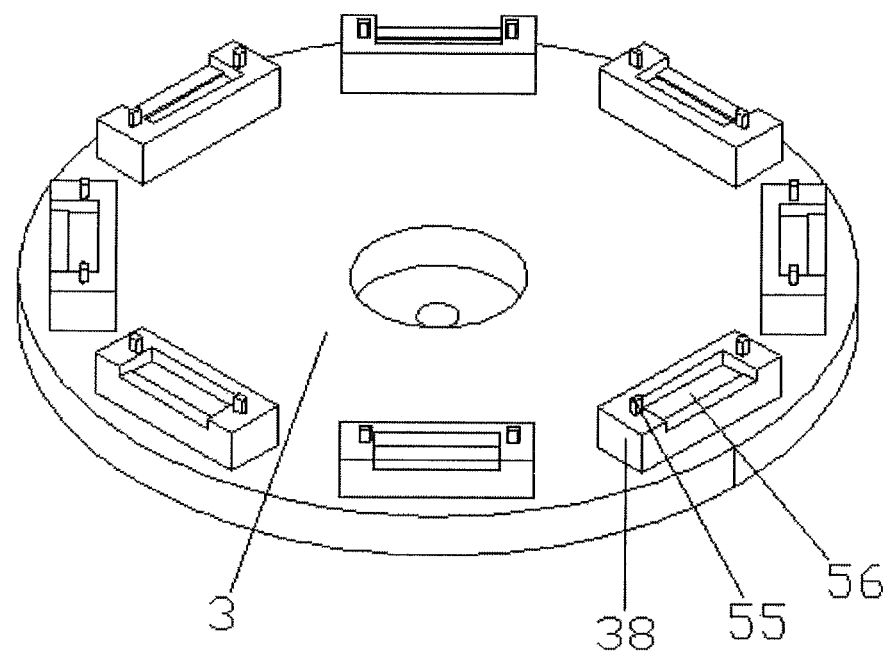
FIG. 2 is a schematic structural view of the turntable.

As shown in FIG. 1, the structure of the present invention is as follows:

An automatic assembly machine for combined control button, including a frame 1, a power distribution control box, turntable 3 and turntable drive device disposed on the frame 1 fitting with each other, wherein the base fixtures 38 fitting the controller bases 48 are evenly disposed along the circumference of the turntable 3; the base fixtures 38 are respectively provided with positioning slots 56 interference fitting with the controller bases 48, and positioning rods 55 are symmetrically disposed on the left and right sides of the positioning slot 56; the positioning rods 55 fit corresponding positioning holes 50 disposed on the controller bases 48 by plugging and fitting; the front side of the frame 1 located at the right side of the turntable 3 is disposed with a base feeding mechanism 2, the rear side of the base feeding mechanism 2 located on the frame 1 is provided with a base transportation device 6 fitting with the base fixtures 38; the left side of the base transportation device 6 along the rotating direction of the turntable 3 is provided with a button assembly mechanism 4 cooperating with the base fixtures 38; the button assembly mechanism 4 cooperates with a button vibration feeding tray 5 disposed on the frame 1; all of the turntable drive device, the base feeding mechanism 2, the button assembly mechanism 4 and the button vibration feeding tray 5 are electrically connected to the power distribution control box. By feeding with the base feeding mechanism 2, carrying with the base transportation device 6 precisely the controller base 48 to the base fixture 38, and pressing buttons in position continuously and automatically with the button assembly mechanism 4, it is possible to address effectively the problems occurred with the existing combined control button manual assembly, such as low production efficiency, high manpower consumption, intensive labor input, and relatively high safety hazard potentials and undesirable defective rate of the electrical connectors.

Figure 3:
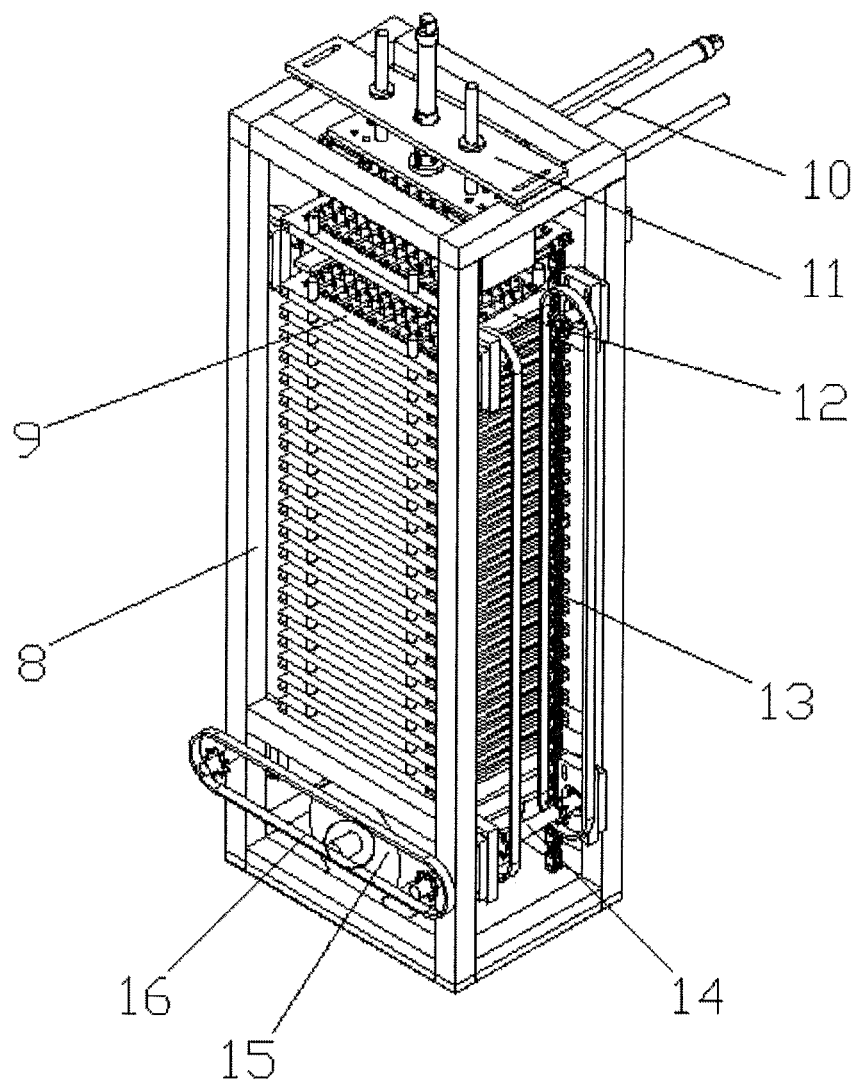
FIG. 3 is a schematic view of the feeding portion in the base feeding mechanism.
Figure 5:
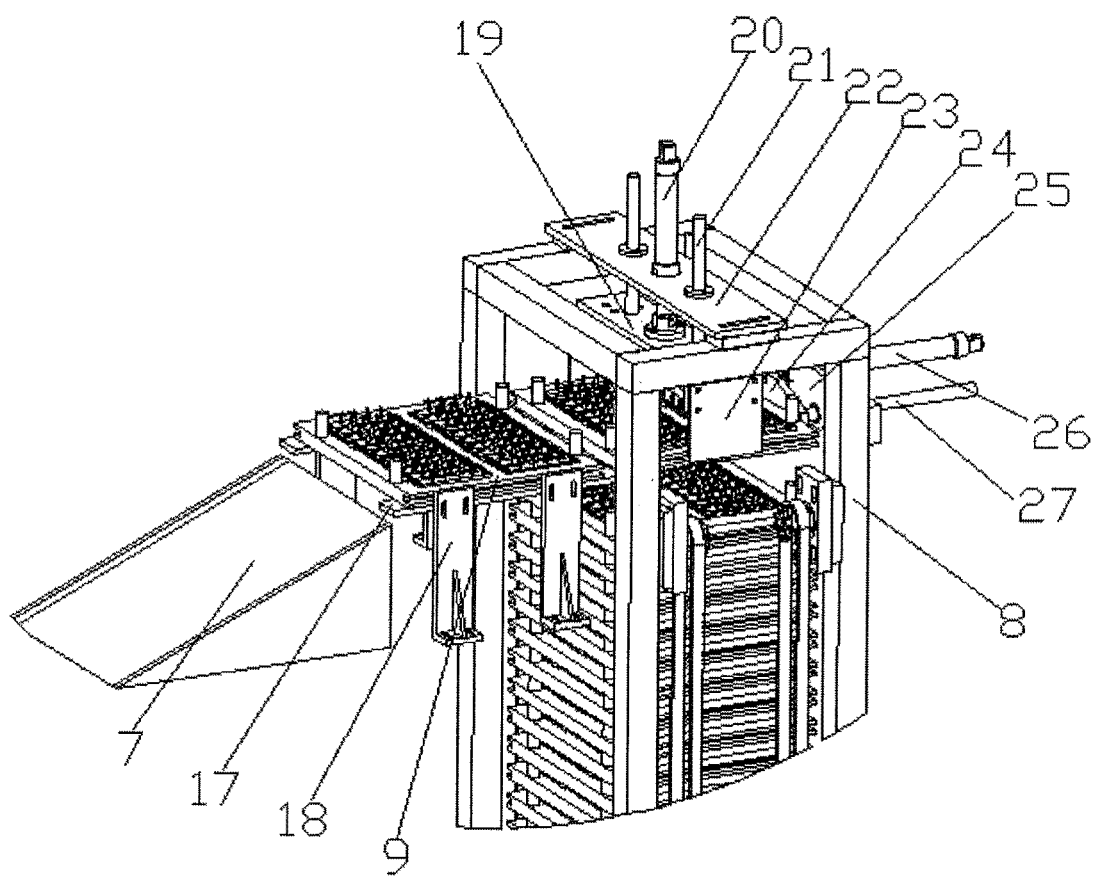
FIG. 5 is a schematic structural view of the cooperation between the feeding tray clamping device and the feeding tray pushing device.

As shown in FIGS. 3 and 5, the base feeding mechanism 2 includes a base feeding support 8 disposed on the front side of the frame 1; feeding chain wheels 13 are symmetrically disposed on the left and right sides of the base feeding support 8; the feeding chain wheel 13 is evenly provided with feeding tray supporting plates 12 fitting with the bottom of a feeding tray sets 9; the feeding chain wheel 13 is synchronously running with a driven feeding shaft 14 disposed on the base feeding support 8; the driven feeding shaft 14 is driven by a feeding motor 15 and a feeding belt pulley 16 disposed on the bottom of the base feeding support 8; the upper end of the base feeding support 8 is provided with a feeding tray clamping device 11 fitting the feeding tray sets 9, and the front side of the base feeding support 8 is provided with a feeding tray pushing device 10; the feeding tray pushing device 10 is flush with the feeding tray set 9 clamped by the feeding tray clamping device 11; all of the feeding motor 15, the feeding tray pushing device 10 and feeding tray clamping device 11 are electrically connected to the power distribution control box. By driving the feeding chain wheels 13 to rotate with the feeding motor 15, and raise the feeding tray sets 9 gradually, clamping with the feeding tray clamping device 11 and pushing the feeding tray sets 9 forwards with the feeding tray pushing device 10, automatic material feeding is achieved, the operation is highly facilitated, and working time is shortened.

Figure 9:
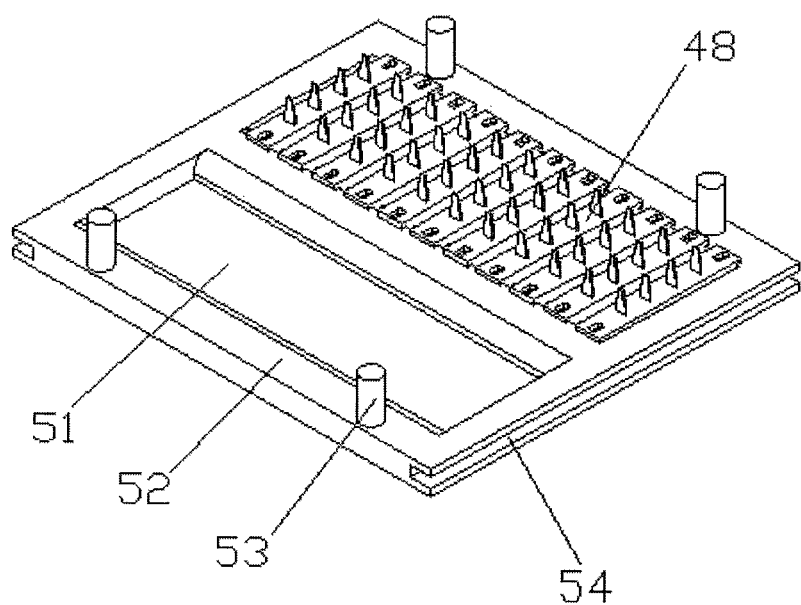
FIG. 9 is a schematic structural view of the feeding tray set.
Figure 10:
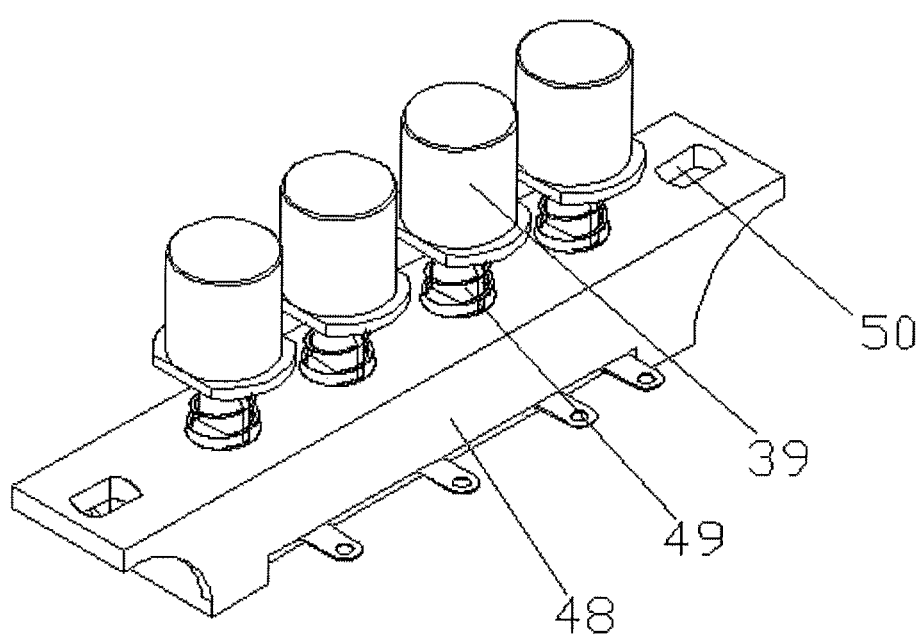
FIG. 10 is a schematic structural view of the combined control button.

As shown in FIG. 9, the feeding tray set 9 includes a feeding tray base 52; the upper surface of the feeding tray base 52 is provided with storage slots 51 fitting the controller base 48; at least four sets of feeding tray separation posts 53 are symmetrically disposed on the front and rear sides of the storage slot 51 on the feeding tray base 52; the left and right sides of the feeding tray base 52 are provided with feeding tray clamping slots 54. With the storage slots 51, it is possible to hold several sets of controller bases 48, and with the tray separation posts 53, it is possible to keep a distance between feeding tray bases 52, and with the feeding tray clamping slots 54, clamping the feeding tray sets 9 with the feeding tray clamping device 11 is greatly facilitated.

Figure 6:
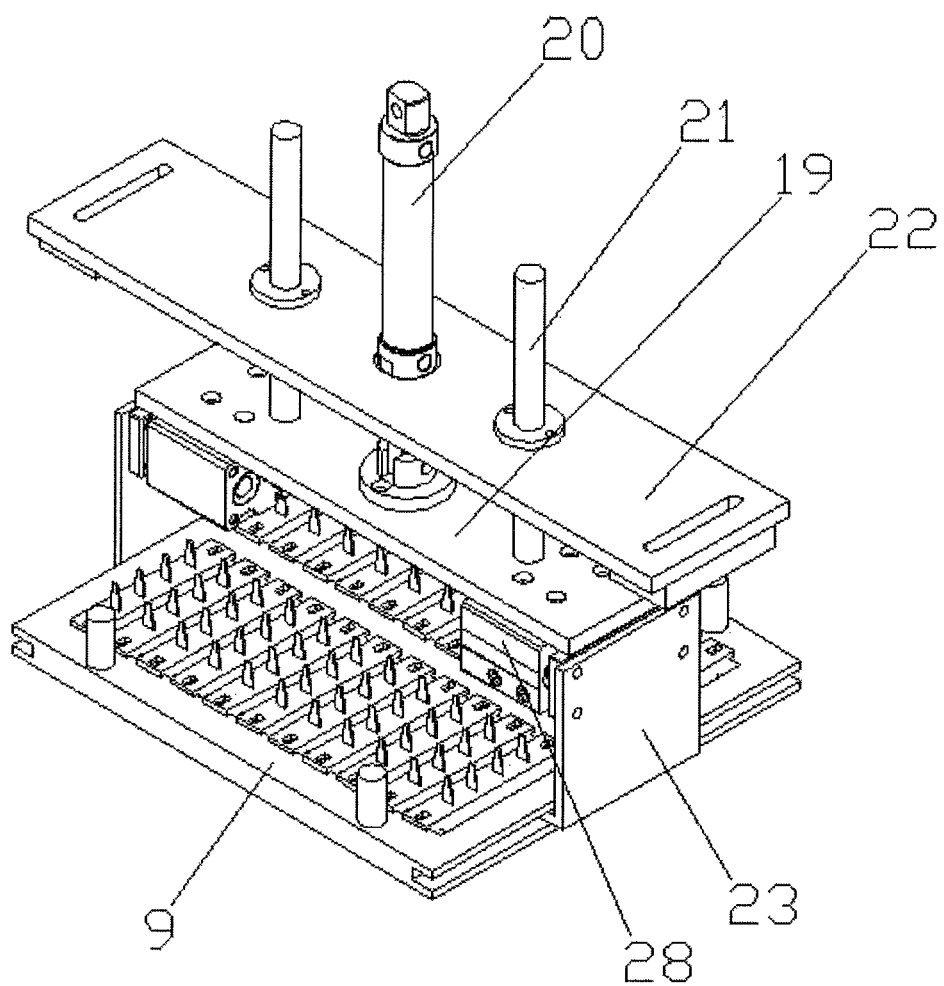
FIG. 6 is a schematic structural view of the feeding tray clamping device.

As shown in FIGS. 5 and 6, the feeding tray clamping device 11 includes a reclaiming fixed seat 22 disposed on the upper end of the base feeding support 8; the reclaiming fixed seat 22 is disposed with a vertically downward feeding tray lifting cylinder 20; the output of the feeding tray lifting cylinder 20 is connected with a feeding tray rising plate 19, and the upper surface of the feeding tray rising plate 19 is connected with feeding tray lifting sliding poles 21, and the feeding tray lifting sliding poles 21 cooperate with the reclaiming fixed seat 22 by plugging and fitting; the left and right ends of the feeding tray rising plate 19 are provided with feeding tray clamping cylinders 28; the outer ends of the feeding tray clamping cylinder 28 is connected with L-shaped lifting plates 23, and the lower end of the lifting plates 23 are slidably fitting with the feeding tray clamping slots 54; the feeding tray lifting cylinder 20 and the feeding tray clamping cylinder 28 are all electrically connected to the power distribution control box. By lifting the lifting plates 23 with the feeding tray clamping cylinders 28, and with the engagement between the lifting plates 23 and the feeding tray clamping slots 54, it is possible to ensure the feeding trays stay stable during lifting, in the meantime, with the height of the feeding tray controlled by the feeding tray lifting cylinder 20, the position of feeding trays is accurate.

As shown in FIG. 5, the feeding tray pushing device 10 includes a pushing fixed seat 25 disposed on the front side of the base feeding support 8, a pushing cylinder 26 is horizontally disposed on the front side of the pushing fixed seat 25, and the output of the pushing cylinder 26 is connected with a feeding tray pushing plate 24; the feeding tray pushing plate 24 is flush with the feeding tray set 9 clamped by the feeding tray clamping device 11, and a pushing sliding rod 27 cooperates with the pushing fixed seat 25 by plugging and fitting is horizontally disposed on the feeding tray pushing plate 24; the pushing cylinder 26 is electrically connected to the power distribution control box. By pushing the feeding tray sets 9 with the pushing cylinder 26, loading of the controller bases is facilitated.

Figure 4:
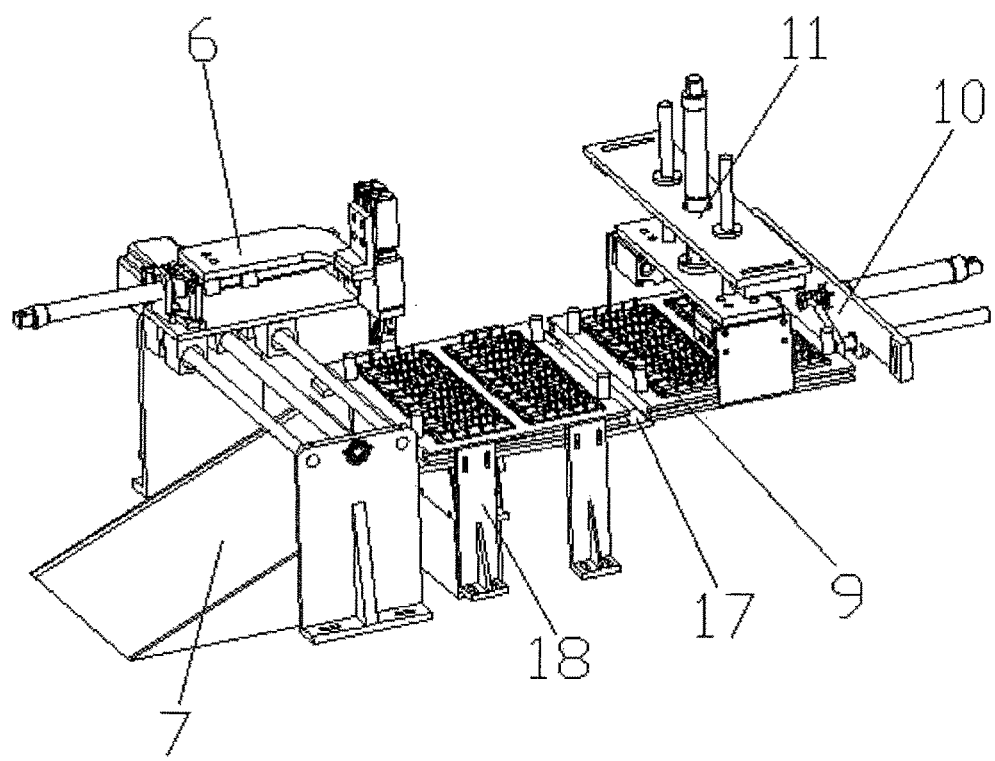
FIG. 4 is a schematic structural view of the cooperation between the feeding tray clamping, the feeding tray pushing, and the base transportation device.

As shown in FIGS. 4 and 5, the rear side of the base feeding support 8 locating at the frame 1 is disposed with a guiding supporting frame 18, the guiding supporting frame 18 is horizontally provided with a feeding tray guiding plate 17, and the rear side of the feeding tray guiding plate 17 is provided with a tilted feed slide way 7, and the upper end of the feed slide way 7 is butted to the rear end of the feeding tray guiding plate 17. By providing the feeding tray guiding plate 17, the feeding tray sets can slide on the feeding tray guiding plate under the operation of the pushing cylinder 16, which facilitates feeding of controller bases 48, and the feeding tray sets 9 can be delivered to the feed slide way 7 and slide down.

Figure 7:
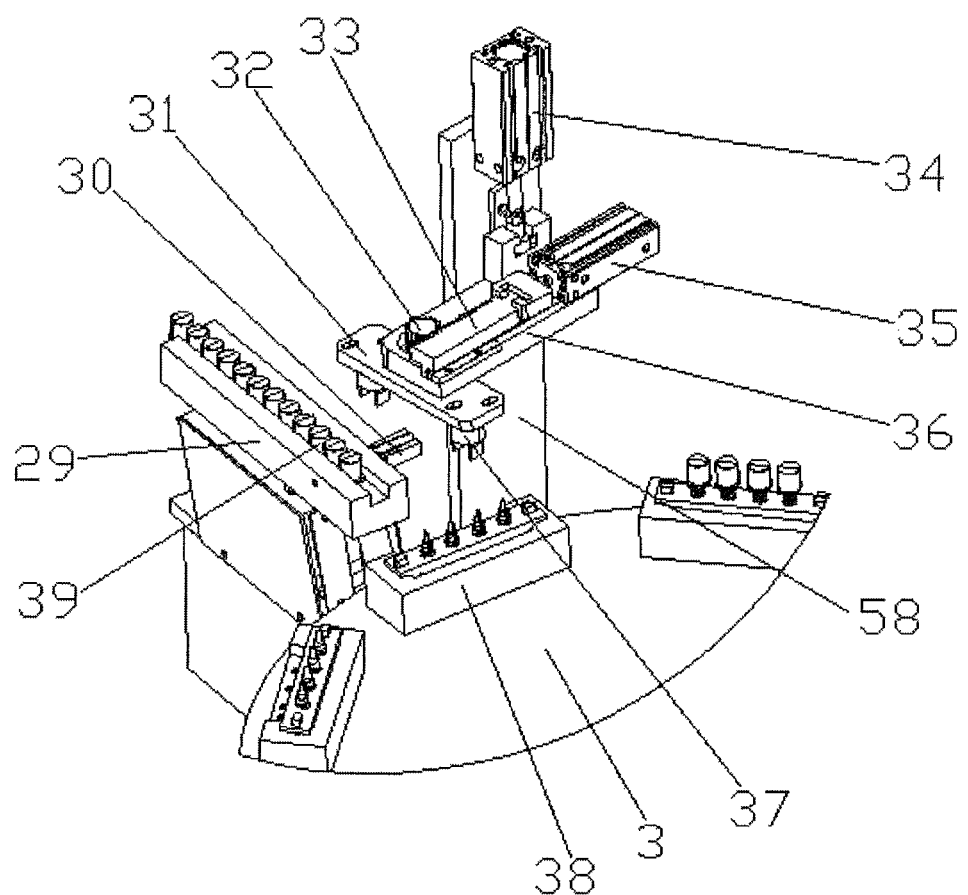
FIG. 7 is a schematic structural view of the button assembly mechanism.

As shown in FIG. 7, the button assembly mechanism 4 includes a button assembly support 30 disposed on the frame 1; a vertically downward reclaiming lifting cylinder 34 is disposed on the upper end of the button assembly support 30; the output of the reclaiming lifting cylinder 34 is connected with a reclaiming lifting seat 36 slidable against the button assembly support 30; the reclaiming lifting seat 36 is horizontally provided with a horizontally movable reclaiming cylinder 35; the output of the horizontally movable reclaiming cylinder 35 is connected with a gear rack 33 slidable against the reclaiming lifting seat 36, and a gear shaft 32 engaging with the gear rack 33 is vertically disposed on the reclaiming lifting seat 36; the lower end of the gear shaft 32 passes through the reclaiming lifting seat 36 and is connected with a button reclaiming seat 31, the bottom of the button reclaiming seat 31 is symmetrically disposed with two button clamping jaws 37; the button clamping jaws 37 cooperate with buttons 39 disposed on the button distribution track 29; the reclaiming lifting cylinder 34, the horizontally movable reclaiming cylinder 35 and the button clamping jaw 37 are all electrically connected to the power distribution control box. By clamping the button 39 inside the button distribution track 29 with the button clamping jaw 37, and lifting the button with the reclaiming lifting cylinder 34 and putting into the base fixture 38, and driving the gear rack 33 with the horizontally movable reclaiming cylinder 35 and in turn the gear shaft 32, the 2 button clamping jaws 37 can work continuously, the buttons are clamped while assembled in the same time, and production efficiency is improved.

Figure 8:
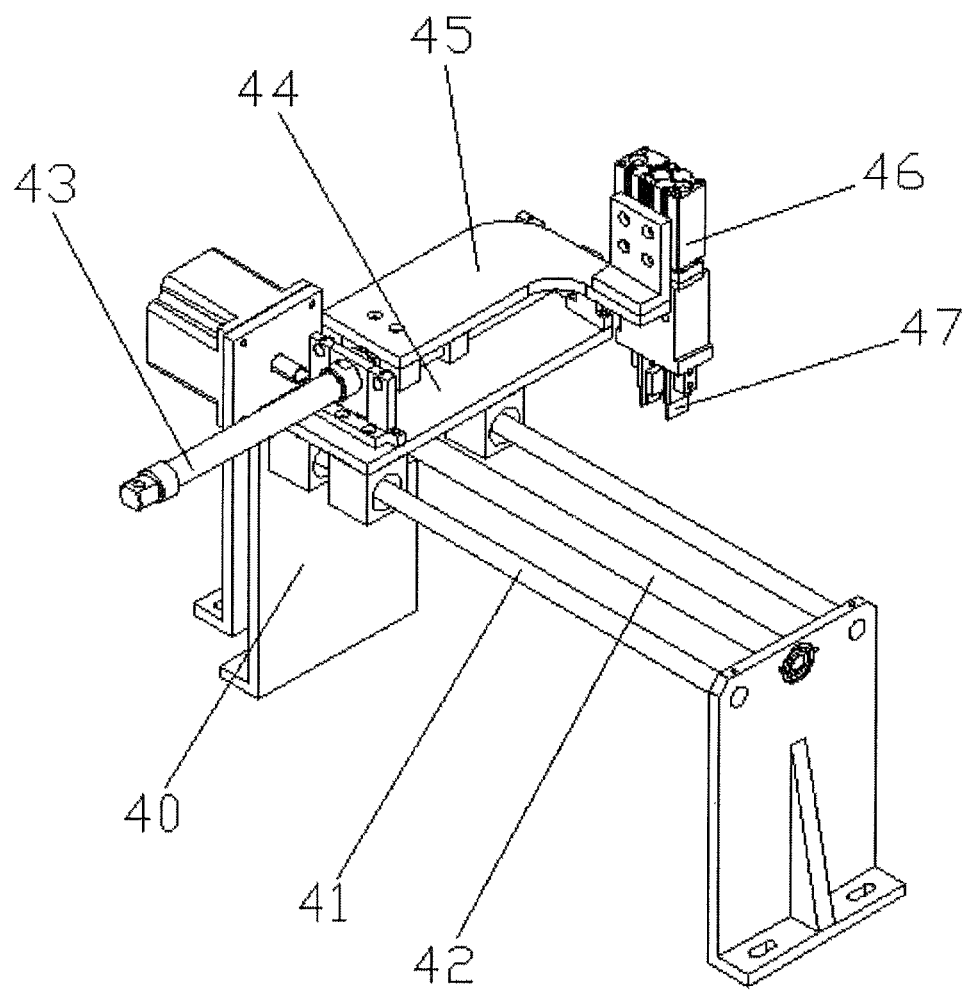
FIG. 8 is a schematic structural view of the base transportation device.

As shown in FIG. 8, the base transportation device 6 includes a transportation support 40 disposed on the frame 1; the transportation support 40 is horizontally provided with transportation sliding rods 41 and a transportation screw rod 42, the transportation screw rod 42 is connected with the output of the transportation servo motor 44 disposed on the transportation support 40; the transportation screw rod 42 is connected with a nut seat, which cooperates with the transportation sliding rods 41 by plugging and fitting, and the nut seat is provided with a transportation translation seat 45; a transportation translation cylinder 43 is horizontally disposed on the transportation translation seat 45, the output of the transportation translation cylinder 43 is connected with a upper reclaiming plate 46; the end of the upper reclaiming plate 46 is vertically provided with a disclaiming lift cylinder 47, and the output of the disclaiming lift cylinder 47 is mounted with a base clamping jaw 57 fitting with the controller base 48; all of the transportation servo motor 44, the transportation translation cylinder 43, the disclaiming lift cylinder 47 and the base clamping jaw 57 are electrically connected to the power distribution control box. By clamping the controller base 48 with the base clamping jaw 57, and lifting with the reclaiming lifting cylinder 47, under the accurate operation of the transportation translation cylinder 43 and the transportation servo motor 44, the controller base can be placed accurately inside the positioning slot 56 in the base fixture 38.

When in use, first put buttons 39 in the button feed vibrating plate 5 and then the base feeding mechanism 2 automatically feeds. The feeding motor 15 drives the feeding chain wheels 13 to rotate, and the feeding tray sets 9 rise gradually, and is individually clamped by the feeding tray clamping device 11. The feeding tray clamping cylinder 28 pulls the lifting plates 23 up and by cooperating with the feeding tray clamping slots 54 it is possible to ensure the tray remains stable when clamping. Meanwhile, the height of the tray is controlled by the feeding tray lifting cylinder 20, and then the feeding tray set 9 is fed forward to the feeding tray guiding plate 17 by the feeding tray pushing device 10, the base clamping jaw 57 clamps the controller base 48 individually and lift it with the reclaiming lifting cylinder 47. The controller base 48 is accurately placed into the positioning slot 56 of the base fixture 38 by the precise movement of the transportation translation cylinder 43 and the transportation servo motor 44. Then the turntable 3 rotates counterclockwise to under the four sets of button assembly mechanisms 4, by clamping buttons 39 in the button distribution track 29 with the button clamping jaw 37, and lifting and placing them on the base fixture 38 with the reclaiming lifting cylinder 34 and driving the gear rack 33 and in turn the gear shaft 32 to have the two button clamping jaws 37 working continuously with the horizontally movable reclaiming cylinder 34, buttons 39 are reclaimed and assembled at the same time. Rotate the base fixture 38 to the left side of the base transportation device 6 when buttons 39 are assembled; clamp the assembled controller base 48 with the base clamping jaw 57 and place it back into the feeding tray set 9 and discharge the feeding tray set 9 fully loaded with the assembled product along the discharging sliding track with the pushing cylinder 26.

In the present invention, it should be noted that the term "includes", "including" or any other variants thereof is intended to encompass a non-exclusive inclusion, such that a process, method, article, or device that comprises a plurality of elements includes not only those elements. It also includes other elements that are not explicitly listed, or elements that are inherent to such a process, method, item, or device.

The principles and embodiments of the present invention have been described with reference to specific examples. The foregoing description of the embodiments is only for the purpose of understanding the method of the present invention and the core idea thereof. The above description is only a preferred embodiment of the present invention, and it should be noted that Due to the finiteness of the textual expression and the infinitely specific structure objectively, it is possible for those skilled in the art to make some improvements, refinements or changes without departing from the principles of the present invention. The above technical features may be combined in an appropriate manner; these improvements, modifications, variations or combinations, or the direct application of the inventive concepts and technical solutions to other applications without modification, are considered to be the scope of protection of the present invention.

What is claimed is:

1. An automatic assembly machine for a combined control button, comprising:
   a frame;
   a power distribution control box;
   a turntable and a turntable drive disposed upon the frame fitting with each other;
   wherein base fixtures fitting controller bases are evenly disposed along a circumference of the turntable;
   the base fixtures are respectively provided with positioning slots for interference fitting with the controller bases;
   positioning rods are symmetrically disposed on left and right sides of each positioning slot;
   the positioning rods fit corresponding positioning holes disposed on the controller bases by plugging and fitting;
   a front side of the frame located at a right side of the turntable is disposed with a base feeding mechanism;
   a rear side of the base feeding mechanism located on the frame is provided with a base transportation device fitting with the base fixtures;

a left side of the base transportation device along a rotating direction of the turntable is provided with a button assembly mechanism cooperating with the base fixtures;
the button assembly mechanism cooperates with a button vibration feeding tray disposed upon the frame; and
all of the turntable drive device, the base feeding mechanism, the button assembly mechanism, and the button vibration feeding tray are electrically connected to the power distribution control box.

2. The automatic assembly machine fora combined control button of claim 1, wherein:
the base feeding mechanism includes a base feeding support disposed on the front side of the frame;
feeding chain wheels are symmetrically disposed on left and right sides of the base feeding support;
the feeding chain wheels are evenly provided with feeding tray supporting plates fitting with a bottom of a feeding tray set;
the feeding chain wheels are synchronously run with a driven feeding shaft disposed on the base feeding support;
the driven feeding shaft is driven by a feeding motor and a feeding belt pulley disposed on a bottom of the base feeding support;
an upper end of the base feeding support is provided with a feeding tray clamping device fitting the feeding tray set, and a front side of the base feeding support is provided with a feeding tray pushing device;
the feeding tray pushing device is flush with the feeding tray set clamped by the feeding tray clamping device; and
all of the feeding motor, the feeding tray pushing device, and the feeding tray clamping device are electrically connected to the power distribution control box.

3. The automatic assembly machine for a combined control button of claim 2, wherein:
the feeding tray set includes a feeding tray base;
an upper surface of the feeding tray base is provided with storage slots fitting the controller bases;
at least four sets of feeding tray separation posts are symmetrically disposed upon front and rear sides of the storage slots upon the feeding tray base; and
left and right sides of the feeding tray base are provided with feeding tray clamping slots.

4. The automatic assembly machine fora combined control button of claim 3, wherein:
the feeding tray clamping device includes a reclaiming fixed seat disposed upon the upper end of the base feeding support;
the reclaiming fixed seat is disposed with a vertically downward feeding tray lifting cylinder;
an output of the feeding tray lifting cylinder is connected with a feeding tray rising plate, an upper surface of the feeding tray rising plate is connected with feeding tray lifting sliding poles, and the feeding tray lifting sliding poles cooperate with the reclaiming fixed seat by plugging and fitting;
left and right ends of the feeding tray rising plate are provided with feeding tray clamping cylinders;
outer ends of the feeding tray clamping cylinders are connected with L-shaped lifting plates
a lower end of the lifting plates are slidably fit with the feeding tray clamping slots; and
the feeding tray lifting cylinder and the feeding tray clamping cylinders are all electrically connected to the power distribution control box.

5. The automatic assembly machine fora combined control button of claim 4, wherein:
the feeding tray pushing device includes a pushing fixed seat disposed on the front side of the base feeding support;
a pushing cylinder is horizontally disposed on a front side of the pushing fixed seat
an output of the pushing cylinder is connected with a feeding tray pushing plate;
the feeding tray pushing plate is flush with the feeding tray set clamped by the feeding tray clamping device
a pushing sliding rod cooperates with the pushing fixed seat by plugging and fitting and is horizontally disposed upon the feeding tray pushing plate; and
the pushing cylinder is electrically connected to the power distribution control box.

6. The automatic assembly machine fora combined control button of claim 5, wherein:
a rear side of the base feeding support located at the frame is disposed with a guiding supporting frame;
the guiding supporting frame is horizontally provided with a feeding tray guiding plate
a rear side of the feeding tray guiding plate is provided with a tilted feed slide way; and
an upper end of the feed slide way is butted to the rear side of the feeding tray guiding plate.

7. The automatic assembly machine fora combined control button of claim 1, wherein:
the button assembly mechanism PA includes a button assembly support disposed on the frame;
a vertically downward reclaiming lifting cylinder is disposed upon an upper end of the button assembly support;
an output of the reclaiming lifting cylinder is connected with a reclaiming lifting seat slidable against the button assembly support;
the reclaiming lifting seat is horizontally provided with a horizontally movable reclaiming cylinder;
an output of the horizontally movable reclaiming cylinder is connected with a gear rack slidable against the reclaiming lifting seat
a gear shaft engaging with the gear rack is vertically disposed on the reclaiming lifting seat
a lower end of the gear shaft passes through the reclaiming lifting seat and is connected with a button reclaiming seat;
a bottom of the button reclaiming seat is symmetrically disposed with two button clamping jaws;
the button clamping jaws cooperate with buttons disposed upon a button distribution track; and
the reclaiming lifting cylinder, the horizontally movable reclaiming cylinder, and the button clamping jaws are all electrically connected to the power distribution control box.

8. The automatic assembly machine fora combined control button of claim 1, wherein:
the base transportation device includes a transportation support disposed on the frame;
the transportation support is horizontally provided with transportation sliding rods and a transportation screw rod;
the transportation screw rod is connected with an output of a transportation servo motor disposed on the transportation support;
the transportation screw rod is connected with a nut seat which cooperates with the transportation sliding rods by plugging and fitting;

the nut seat is provided with a transportation translation seat;

a transportation translation cylinder is horizontally disposed on the transportation translation seat;

an output of the transportation translation cylinder is connected with an upper reclaiming plate;

an end of the upper reclaiming plate is vertically provided with a disclaiming lift cylinder an output of the disclaiming lift cylinder is mounted with a base clamping jaw fitting with the controller base; and all of the transportation servo motor, the transportation translation cylinder, the disclaiming lift cylinder, and the base clamping jaw are electrically connected to the power distribution control box.

* * * * *